Dec. 9, 1969 S. GOLEN 3,482,391

DAY AND DATE CALENDAR CLOCK MECHANISM

Filed June 25, 1968 2 Sheets-Sheet 1

Selig Golen

INVENTOR.

BY Clarence A. O'Brien and Harvey B. Jacobson

Attorneys

Dec. 9, 1969 S. GOLEN 3,482,391

DAY AND DATE CALENDAR CLOCK MECHANISM

Filed June 25, 1968 2 Sheets-Sheet 2

Selig Golen

INVENTOR.

BY Clarence A. O'Brien and Harvey B. Jacobson

Attorneys

United States Patent Office 3,482,391
Patented Dec. 9, 1969

3,482,391

DAY AND DATE CALENDAR CLOCK MECHANISM

Selig Golen, 6560 SW. 92nd Ave., Miami, Fla. 33143

Filed June 25, 1968, Ser. No. 739,873
Int. Cl. G04b 19/24
U.S. Cl. 58—5 11 Claims

ABSTRACT OF THE DISCLOSURE

A clock including driven hour and minute hand supporting shafts and a pair of dials with the first dial having numerals 1–31 spaced equally about its peripheral portion with four blank spaces disposed between the numerals 1 and 31 and the second dial including 35 circumferentially spaced zones with indicia representing 35 consecutive week days thereon in the 35 zones. The first and second disks are journaled for rotation and first means is provided for drivingly advancing the first disk one space for every two revolutions of the clock hour shaft and the first disk includes a one-way drive connection with the second disk for rotating the latter one revolution in response to one revolution of the first disk. A masking panel is disposed over the first and second disks whereby only one space and a corresponding zone of the first and second disks may be viewed at one time. The drive connection between the first disk and the second disk constitutes a detent drive connection and the second disk is manually advanceable to also manually advance the first disk whereby the date may be set and thereafter manually shiftable independent of shifting of the first disk in a reverse direction so as to set the day of the week.

The clock of the instant invention includes relatively simple drive and positioning components for the day of the month and day of the week disks thereof and the disk with the days of the week thereon includes an exposed peripheral portion which may be manually engaged in order to first advance the day of the week disk so as to also advance the day of the month disk and then shiftable in the opposite rotational direction, independent of rotation of the day of the month disk to set the day of the week disk.

The main object of this invention is to provide a calendar clock for indicating the day of the week and the day of the month.

Another object of this invention is to provide a calendar clock including rotatable first and second disks having indicia thereon indicating the first day of the month and the day of the week, respectively, and with the day of the month disk drivingly connected to the day of the week disk by means of a one-way drive connection and the day of the month disk being driven by an hour hand shaft of a clock mechanism through an intermittent drive assembly including detent means for releasably retaining the day of the month disk in advanced rotated position.

Yet another object of this invention is to provide a calendar clock with means whereby the day of the week disk has one peripheral portion thereof exposed which may be manually advanced in order to rotate both the day of the week disk and the day of the month disk whereby the latter may be adjusted and which may be thereafter manually shifted in the reverse direction independent of rotation of the day of the month disk in order that the day of the week may be set.

A final object of this invention to be specifically enumerated herein is to provide a calendar clock in accordance with the preceding objects which will conform to conventional forms of manufacture, be of simple construction and easy to set so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3:
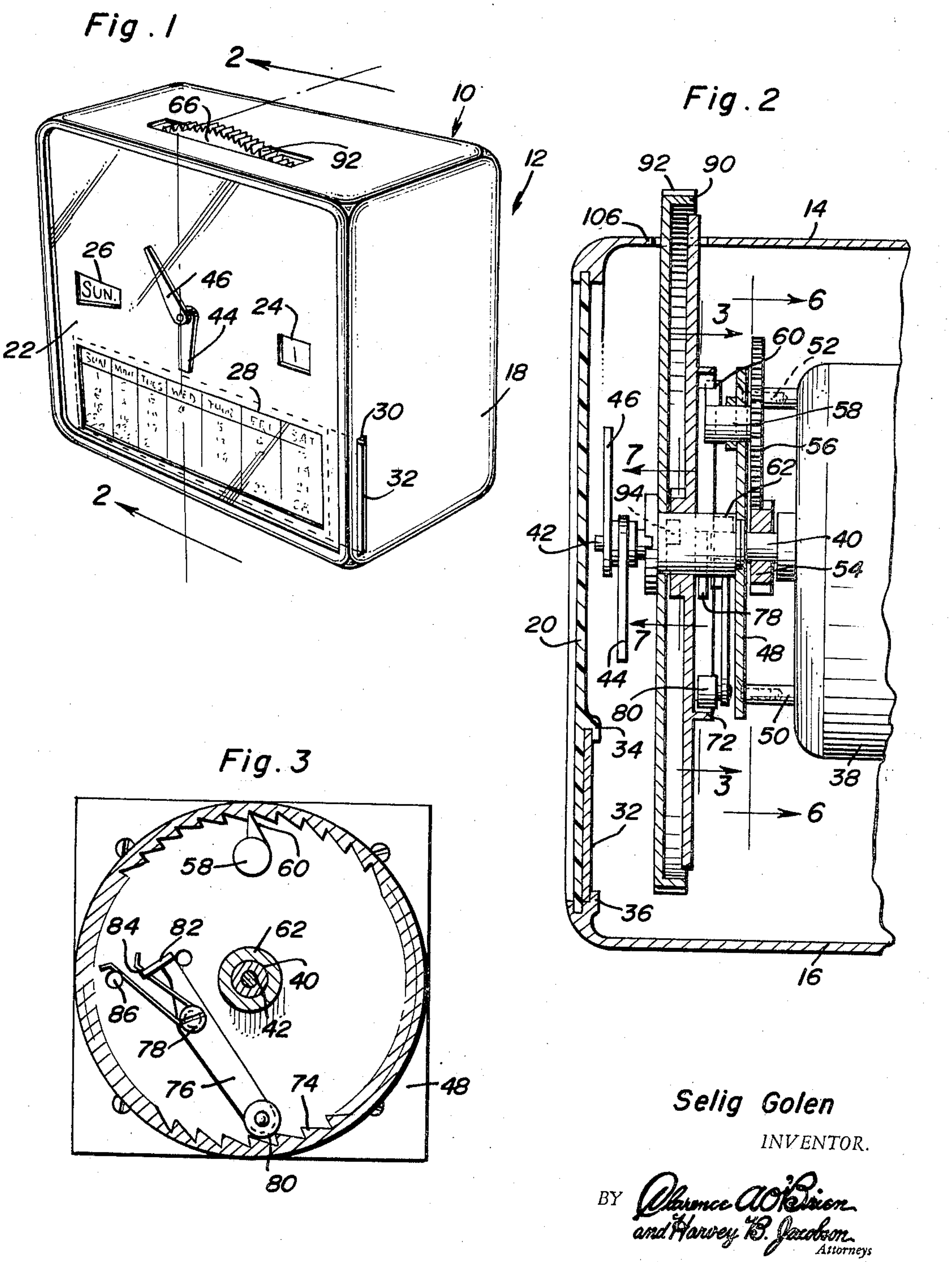
FIGURE 1 is a perspective view of the calendar clock of the instant invention.
FIGURE 2 is an enlarged fragmentary vertical sectional view taken substantially upon the plane indicated by the section line 2—2 of FIGURE 1.
FIGURE 3 is a fragmentary vertical sectional view taken substantially upon the plane indicated by the section line 3—3 of FIGURE 2.

Referring now more specifically to the drawings, the numeral 10 generally designates the clock which includes a housing referred to in general by the reference numeral 12. The housing 12 includes top and bottom walls 14 and 16 as well as opposite sidewalls 18 interconnected by means of a transparent front cover or face 20. The clock 10 further includes a masking panel 22 disposed rearward of the face 20 and which includes a first opening 24, a second opening 26 and a third opening 28. The masking panel additionally has indicia thereon representing the hour positions of the face of a clock and the right hand sidewall 18 includes a vertical slot 30 through which a tab 32 may be inserted for registry with the aperture or opening 28, the tab 32 having the days and weeks of a month printed thereon. The masking panel 22 includes rearwardly displaced flange portions 34 and 36 defining a channel in which the adjacent upper and lower marginal edge portions of the tab 32 are slidingly received for support of the tab 32 in proper registry with the aperture or opening 28.

The housing 12 has a conventional electric motor 38 suitably supported therein. The motor 38 may be powered by domestic household current or any other suitable source of electrical potential such as a storage battery. Further, the motor 38 may be replaced by a spring driven motor, if desired.

The motor 38 includes an outer tubular hour hand drive shaft 40 which rotates twice in 24 hours and an inner minute hand drive shaft 42 which rotates once each hour. An hour hand 44 is mounted on the forward end of the shaft 40 and a minute hand 46 is mounted on the forward end of the shaft 42.

A mounting plate 48 is supported on the front of the motor 38 by means of suitable tubular spacers 50 and fasteners 52 and a first gear wheel 54 is mounted on the hour hand shaft 40 for rotation therewith at the same speed. A second gear wheel 56 is journaled from the mounting plate 48 and is meshed with the gear wheel 54.

The gear wheel 54 has a predetermined number of teeth spaced about its periphery an the gear wheel 56 has twice the number of gear teeth on the gear wheel 54 spaced about its periphery. Accordingly, the gear wheel 56 will rotate once in 4 hours.

The gear wheel 56 includes a shaft portion 58 by which it is journaled from the mounting plate 48 and which projects forwardly through the mounting plate 48 and has a ratchet dog 60 thereon.

A headed sleeve bearing member 62 is removably threadedly engaged with the mounting plate 48 and the shafts 40 and 42 extend through the bearing member 62. In addition, first and second disks 64 and 66 are journaled on the bearing member 62 intermediate the mounting plate 48 and the hands 44 and 46 and the disk 64 has a plurality of zones spaced circumferentially about its periphery numbered consecutively from 1 to 31 and including four unnumbered zones between zone number 1 and zone number 31. The disk 64 additionally includes a forwardly projecting hub 68 having 35 detent teeth 70 spaced about its periphery. Further, the disk 64 also includes a reduced diameter concentrically disposed and circumferentially extending axially projecting flange 72 having 35 detent teeth 74 formed on its inner periphery.

Figure 5:
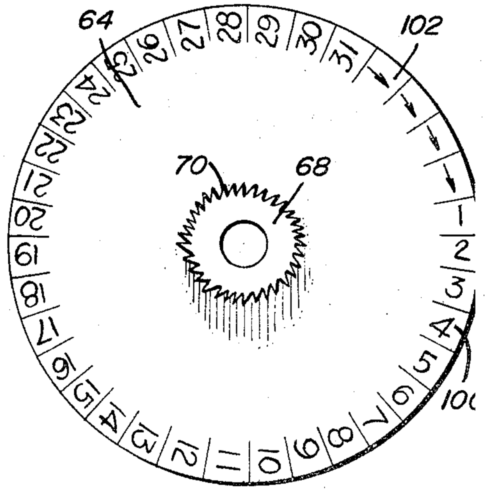
FIGURE 5 is a front elevational view of the day of the month disk.
Figure 6:
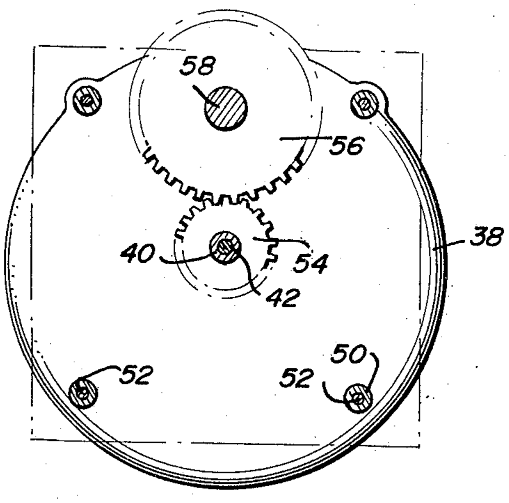
FIGURE 6 is a fragmentary vertical sectional view taken substantially upon the plane indicated by the section line 6—6 of FIGURE 2.
Figure 7:
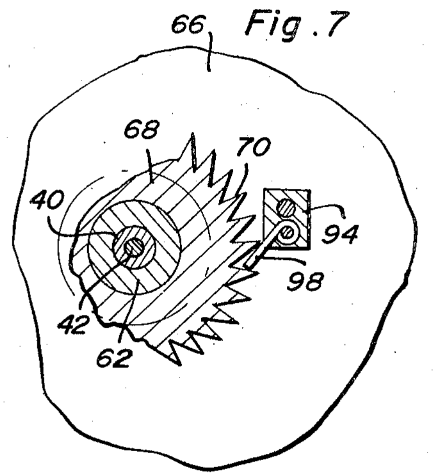
FIGURE 7 is a fragmentary enlarged vertical sectional view taken substantially upon the plane indicated by the section line 7—7 of FIGURE 2.

A detent lever arm 76 is pivotally supported from the mounting plate 48 by means of a pivot fastener 78 and has a roller 80 journaled on one end which is seatingly engageable between adjacent teeth 74. The other end of the lever 76 includes a laterally directed flange 82 with which one end of a spring 84 wound about the pivot fastener 78 is engaged, the other end of the spring 84 abutting against a post 86 supported and projected forwardly from the mounting plate 48. Accordingly, it may be seen that every two revolutions of the hour hand shaft 40 will be operative to cause the ratchet detent 60 to advance the disk 64 1/35 of a revolution in a counter clockwise direction as viewed in FIGURE 5 of the drawings.

The second disk 66 includes a rearwardly and axially extending circumferential flange portion 90 which is serrated as at 92 and the flange portion 90 at least partially encloses the disk 64. Further, the disk 66 includes a mounting block 94 secured to its rear face from which one end of a generallly flat leaf spring 98 is supported, the free end of the leaf spring 98 being disposed for engagement with the detent teeth 70 on the disk 64. As viewed from the front of the clock, the spring 98 and its engagement with the detent teeth 70 prevents counterclockwise rotation of the disk 66 independent of counterclockwise rotation of the disk 64 but allows clockwise rotation of the disk 66 independent of clockwise rotation of the disk 64.

It will be noted that the indicia 100 indicating the days of the month on the disk 64 and the indicia 102 on the disk 64 disposed between the indicia 100 indicating the first and thirty-first days of the month are viewable through the aperture or window 24 in the masking panel 22. Further, it will be noted that the indicia 104 on the disk 66 indicating the days of the week are viewable through the window or aperture 26 in the masking panel 22.

Figure 4:
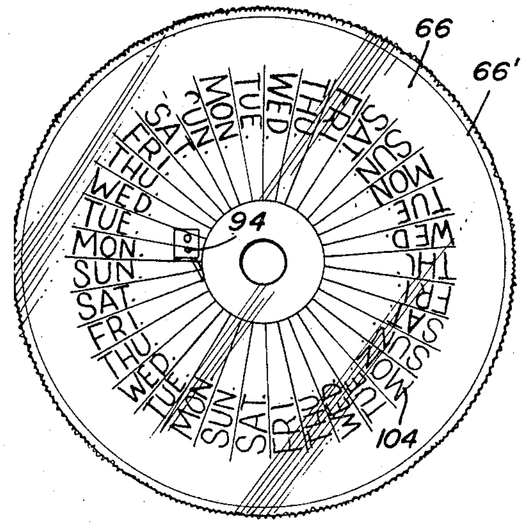
FIGURE 4 is a front elevational view of the day of the week disk.

In operation, when it is desired to set the dials 64 and 66, the upper peripheral portion of the disk 66 which projects through an opening 106 formed in the top wall 14 of the housing 12 may be engaged and manually urged to the left as viewed in FIGURES 1 and 4 of the drawings. This of course will advance the disk 64 until the proper indicia 100 has been registered with the window or opening 24 in the masking panel 22. Thereafter, the upper peripheral portion of the disk 66 may be urged to the right as viewed in FIGURES 1 and 4 of the drawings independent of similar rotation of the disk 64 in order to register the correct indicia 104 with the window or opening 26 in the masking panel 22.

The disk 66 is constructed of transparent material such as plastic and includes an outer periperhal portion 66' disposed outwardly of the indicia 104 through which the indicia 100 and 102 on the disk 64 may be viewed. Of course, the detent rod 98 prevents counterclockwise rotation of the disk 66 independent of clockwise rotation of the disk 64, but allows clockwise rotation of the disk 66 independent of clockwise rotation of the disk 64. Further, the engagement of the roller 80 journaled on the free end of the lever arm 76 with the teeth 74 carried by the disk 64 maintains the disk 64 in successive advanced positions intermediate advancement of the disk 64 by the ratchet dog 60 carried by the shaft portion 58 of the gear wheel 56. Thus, the disk 66 may be readily advanced in a counterclockwise direction to advance both the disk 66 and the disk 64 and subsequently rotated in a clockwise direction independent of rotation of the disk 64 in order to set the propert day of the week after the proper day of the month on the disk 64 has been registered with the opening or aperture 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A day and date indicating mechanism comprising a pair of first and second disks supported for intermittent rotation about stationary axes, means frictionally drivingly coupling said first disk to said second disk for equal forward rotation of the latter in response to forward rotation of the former, said first and second disks including indicia spaced about peripheral portions thereof indicating successive days of the month and successive days of the week in corresponding forward directions of rotation thereof, means operative to successively forwardly advance said first disk one indicia position once every twenty-four hours, means operative to prevent reverse rotation of said first disk, the first-mentioned means being operative to allow reverse rotation of said second disk relative to said first disk in response to rotational torque greater than a predetermined value being applied to said second disk to rotate the latter in a reverse direction, said disks each having thirty-five peripherally spaced positions thereof, said first disk having indicia at the positions thereof indicating thirty-one successive days of the month with four extra positions disposed between those indicating the first and thirty-first days of the month and the positions of said second disk having indicia indicating successive days of five weeks.

2. A day and date indicating mechanism comprising a pair of first and second disks supported for intermittent rotation about stationary axes, means frictionally drivingly coupling said first disk to said second disk for equal forward rotation of the latter in response to forward rotation of the former, said first and second disks including indicia spaced about peripheral portions thereof indicating successive days of the month and successive days of the week in corresponding forward directions of rotation thereof, means operative to successively forwardly advance said first disk one indicia position once every twenty-four hours, means operative to prevent reverse rotation of said first disk, the first-mentioned means being operative to allow reverse rotation of said second disk relative to said first disk in response to rotational torque greater than a predetermined value being applied to said second disk to rotate the latter in a reverse direction, a clock having a driven hour hand shaft, said means operative to successively forwardly advance said first disk including a drive wheel mounted on said hour hand shaft and drivingly engaged with a second wheel journaled from said clock for rotation of said second wheel one revolution for every two revolutions of the drive wheel, said second wheel including a radially projecting pawl tooth and said first disk including peripherally arranged teeth equal in number to the number of said indicia positions successively engageable by said pawl tooth each time said second wheel rotates through one revolution.

3. The combination of claim 2 wherein said teeth project generally radially inwardly from an outer peripheral portion of said first disk and said second wheel is disposed between said teeth and the axis of rotation of said second wheel.

4. The combination of claim 3 wherein the axis of rotation of said hour hand shaft coincides with the axes of rotation of said disks.

5. The combination of claim 1 wherein the axes of rotation of said disks coincide.

6. The combination of claim 5 including a clock having a driven hour hand shaft, said disks being journaled on said hour hand shaft.

7. The combination of claim 6 including a drive wheel mounted on said hour hand shaft for rotation therewith, said means for successively advancing said first disk including said drive wheel and means establishing an intermittent drive connection between said drive wheel and said first disk.

8. The combination of claim 7 including means connected between said clock and said first disk operative to yieldingly retain said first disk in successive advanced positions with successive indicia positions thereof in predetermined position relative to said clock.

9. The combination of claim 8 including a masking panel disposed forward of said disks and having openings therein with which said indicia on said disks are successively registrable.

10. A day and date indicating mechanism comprising a pair of first and second disks supported for intermittent rotation about stationary axes, coacting friction detent means carried by said disks for rotation therewith and frictionally drivingly coupling said first disk to said second disk for equal forward rotation of the latter in response to forward rotation of the former, said first and second disks including indicia spaced about peripheral portions thereof indicating successive days of the month and successive days of the week in corresponding forward directions of rotation thereof, means operative to successively forwardly advance said first disk one indicia position once every twenty-four hours, means operative to prevent reverse rotation of said first disk, the first-mentioned means being operative to allow reverse rotation of said second disk relative to said first disk in response to rotational torque greater than a predetermined value being applied to said second disk to rotate the latter in a reverse direction.

11. The combination of claim 10 wherein said disks each have thirty-five peripherally spaced positions thereof, said first disk having indicia at the positions thereof indicating thirty-one successive days of the month with four extra positions disposed between those indicating the first and thirty-first days of the month and the positions of said second disk having indicia indicating successive days of five weeks.

References Cited

UNITED STATES PATENTS 2,757,507 8/1956 Boyles ................ 58—5

RICHARD B. WILKINSON, Primary Examiner

E. C. SIMMONS, Assistant Examiner

U.S. Cl. X.R.

58—58